United States Patent [19]

Bishop

[11] Patent Number: 5,511,336

[45] Date of Patent: Apr. 30, 1996

[54] FISHING ROD HOLDER

[76] Inventor: Christopher Bishop, Sir Sam's Ski Area, Box 180, Haliburton, Ontario, Canada, K0M 1S0

[21] Appl. No.: 259,109

[22] Filed: Jun. 13, 1994

Related U.S. Application Data

[63] Continuation-in-part of Ser. No. 225,056, Apr. 11, 1994, abandoned.

[51] Int. Cl.$^6$ .................................................. A01K 97/10
[52] U.S. Cl. ........................... 43/21.2; 224/922; 224/253
[58] Field of Search .................... 43/21.2; 206/315.11; D22/147; 224/922, 252, 253, 271, 272, 251, 255

[56] References Cited

U.S. PATENT DOCUMENTS

| | | | |
|---|---|---|---|
| 2,781,958 | 2/1957 | Lewandowski | 224/246 |
| 2,954,909 | 10/1960 | Miller et al. | 224/200 |
| 3,556,365 | 1/1971 | Bull | 224/922 X |
| 3,874,573 | 4/1975 | Fruscella et al. | 224/922 X |
| 4,121,743 | 10/1979 | Burton | 224/271 |
| 4,500,059 | 2/1985 | Papizan | 248/205.1 |
| 4,569,466 | 2/1986 | Webber | 224/253 |
| 4,587,757 | 5/1986 | Lirette | 43/21.2 |
| 4,986,459 | 1/1991 | Yarbrough, Jr. | 224/253 |
| 5,014,891 | 5/1991 | King | 224/252 |
| 5,014,892 | 5/1991 | Copeland | 224/271 |
| 5,232,137 | 8/1993 | Devine | 224/252 |

*Primary Examiner*—P. Austin Bradley
*Assistant Examiner*—Jeanne M. Elpel
*Attorney, Agent, or Firm*—Bereskin & Parr

[57] ABSTRACT

A fishing rod holder having a hip plate made of thin, flexible plastic, with a cylindrical tube, open at its top and bottom, attached to the hip plate. The tube slopes, from its bottom to its top, both forwardly and outwardly from the hip plate and supports a fishing rod, with the reel of the rod hanging and being supported on the top edge of the tube. When the hip plate is worn on a user's belt, the tip of the rod, and the hook, are located forwardly and to the side of the user, keeping them out of harm's way. The tube can be slidingly detachable from the hip plate and can be made in various forms to hold different kinds of fishing rods.

13 Claims, 3 Drawing Sheets

FISHING ROD HOLDER

This invention is a continuation-in-part application of application Ser. No. 08/225,856 filed Apr. 14, 1994, now abandoned.

FIELD OF THE INVENTION

This invention relates to a fishing rod holder.

BACKGROUND OF THE INVENTION

Persons who fish using a fishing rod must frequently lay the rod down in order to use their hands for other purposes. When the fishing rod is laid down, the hook often snags on various objects, tangling the line, resulting in considerable effort and time wastage to free the hook and line. If the line is in the water (for example when the person fishing is in a boat), a fish may take the hook when the rod has been laid down, sometimes pulling the rod into the water. In general, because of the inconvenience of handling the rod when it has a hook attached, fishing can sometimes be a frustrating rather than a pleasant experience.

Accordingly, it is an object of the present invention to provide a fishing rod holder which will reduce or eliminate the need for a fishing rod to be laid down when its user needs to use his or her hands for other purposes.

BRIEF SUMMARY OF THE INVENTION

In one of its aspects the present invention provides a fishing rod holder comprising:

(a) a hip plate member having an inner surface, a top and a bottom, and front and rear edges, said inner surface being shaped to rest against a wearer's hip and providing a substantial area of support for said holder against the wearer's hip, said inner surface being adapted to be worn in a substantially vertically extending direction with said front and rear edges facing substantially frontwardly and rearwardly, (b) said hip plate member including attachment means therein adapted to cooperate with a wearer's belt to be supported by such belt, (c) an elongated hollow member mounted on said hip plate member, said hollow member having an elongated opening therethrough and an encircling side wall, said opening having an axis, (d) said axis having a forward slope from the vertical and an outward slope from the vertical when said holder is worn on the belt of a wearer with said inner surface of said hip plate member being substantially vertical and facing frontwardly and rearwardly, (e) said forward slope being between 20° and 45° from the vertical and said outward slope being between 10° and 30° from the vertical.

Further objects and advantages of the invention will appear from the following description, taken together with the accompanying drawings.

DETAILED DESCRIPTION OF PREFERRED EMBODIMENT

Figure 1:
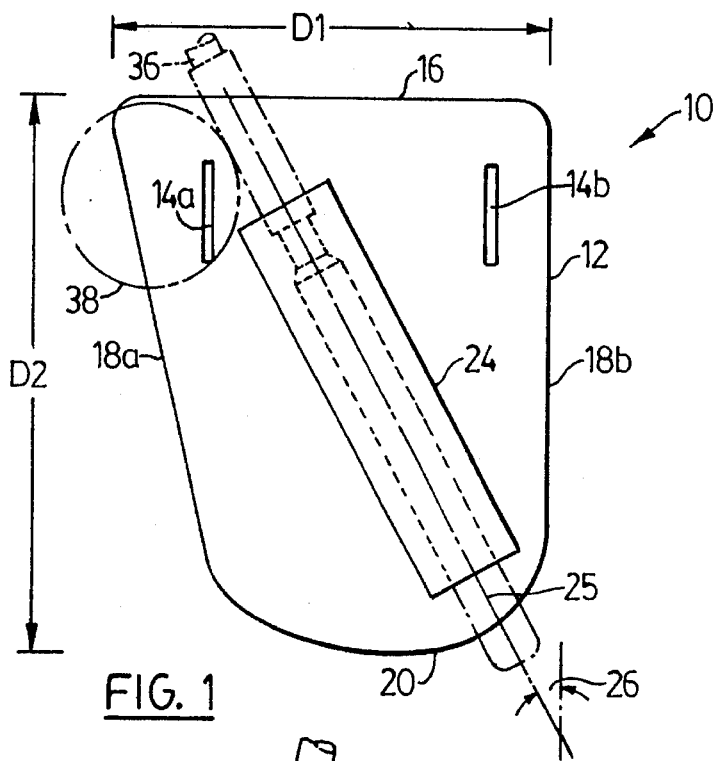
FIG. 1 is a plan view of a fishing rod holder according to the invention.
Figure 3:
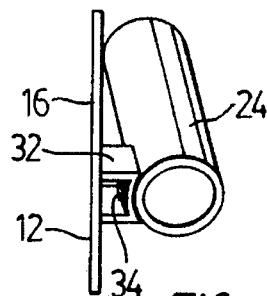
FIG. 3 is a top view of the fishing rod holder of FIG. 1.

Reference is made to the drawings, which show a fishing rod holder according to the invention and generally indicated at 10. The fishing rod holder 10 includes a support member or hip plate 12, preferably made from thin flexible plastic (e.g. about 1/32 inch thick, or slightly thicker). Hip plate 12 is intended to be worn on a user's hip and therefore contains two aligned spaced belt slots 14a, 14b through which the end of a belt may be passed.

Hip plate 12 must be large enough to provide a substantial contact area with the user's hip, and therefore it is typically 5 inches wide (dimension D1) and 6¾ inches high (dimension D2). These dimensions may be varied within about ±1 inch each. The upper edge 16 of hip plate 12 is straight and horizontal when worn, while the side edges 18a, 18b are either vertical or converge slightly, toward a bottom edge 20 which is normally rounded. Generally, the hip plate 12 has a "holster" shape, but its inner surface 22 is either planar, or slightly concave, to be flat against the hip when worn and to be in a substantially vertical line or plane from its top to its bottom.

Figure 4:
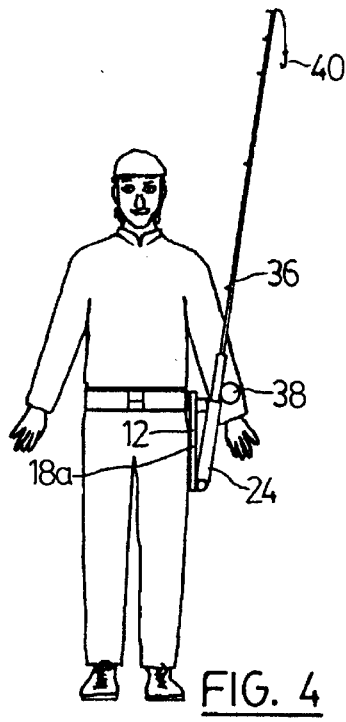
FIG. 4 is a diagrammatic view showing a person wearing the fishing rod holder of FIG. 1.

The hip plate 12 is intended to be worn on a wearer's belt 23 as shown in FIG. 4, at the side of the user's hip, with the edges 18a, 18b of inner surface 22 facing substantially frontwardly and rearwardly respectively, as well as lying in a generally vertical plane.

Attached to hip plate 12 is a generally cylindrical tube 24. Tube 24 is also made of thin plastic (e.g. again about 1/32 inch thick) and is typically between 1.5 and 2 inches and preferably between 1.5 and 1.625 inches in diameter and about 4½ inches long (again these dimensions may vary slightly). Tube 24 serves to support a fishing rod.

An important feature of the invention is that the axis 25 of tube 24 slopes at two angles. Firstly, it slopes forwardly from bottom to top, as indicated by angle 26 in FIG. 1. Typically angle 26 is 30° from the vertical, but this may vary slightly e.g. angle 26 may be between 20° and 45°.

Figure 2:
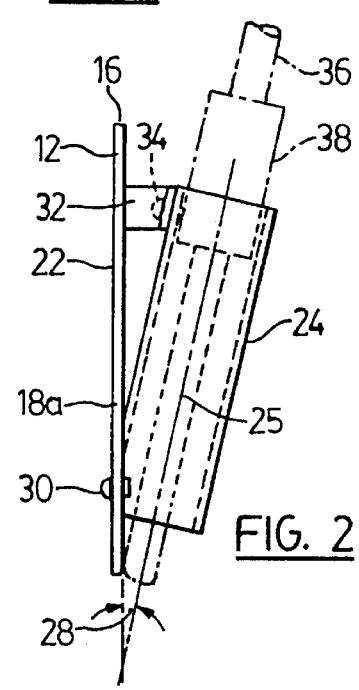
FIG. 2 is an end view of the fishing rod holder of FIG. 1.

Secondly, and as shown in FIG. 2, the axis 25 of tube 24 slopes outwardly from bottom to top as indicated by angle 28. Angle 28 is typically between 10° and 30°, preferably between 20° and 25°, and most preferably 25°. Angle 28 is also measured from the vertical.

Tube 24 may be connected to hip plate 12 by any desired means. For example the bottom connection may be by a plastic fastener 30, and the top connection may be by a plastic support member 32 molded as part of plate 12 and fastened by another plastic fastener 34 to the upper part of tube 24. Alternatively the parts may be held together by adhesive or may be molded as a single piece.

When a fishing rod 36 (indicated in dotted lines in FIGS. 1 and 2 and in full lines in FIG. 4) is inserted into the tube 24, its depth of penetration into the tube is limited by the reel 38, which catches on and hangs on top edge of the tube 24. This supports the rod. The angles 26, 28 ensure that the fishing rod will slope forwardly and outwardly so as not to interfere with the wearer's body. The forward and outward slope also ensure that the hook 40, if near the tip of the rod, is located well away from the user's head.

In practice, if the hip plate 12 is made of thin flexible plastic, its inner surface will automatically assume a slightly concave shape when worn. However the plastic must be sufficiently rigid to provide a broad area of support (as mentioned) when a fishing rod is located in tube 24.

Figure 5:
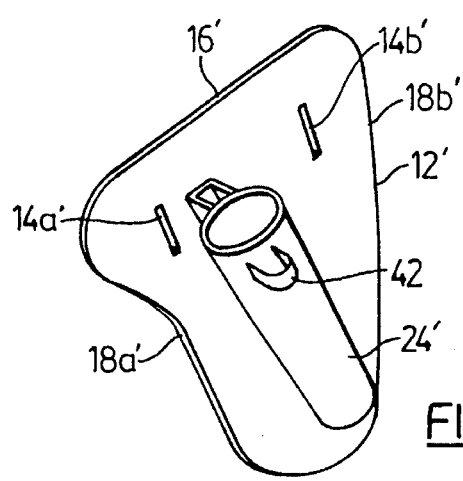
FIG. 5 is a perspective view showing a modification of the fishing rod holder of FIG. 1.

A modification of the invention is shown in FIG. 5, in which primed reference numerals indicate parts corresponding to those of FIGS. 1 to 4. In FIG. 5, a loop 42 is mounted at the top of and extends outwardly from the outside surface of tube 24'. Loop 42 may be fastened to tube 24 in any conventional manner and serves to support an accessory tool, such as a pair of pliers.

While tube 24 has been described as cylindrical, other shapes may also be used so long as they support the butt end of a fishing rod and hold the rod so that it slopes forwardly and outwardly. For example it can be slightly conical (wider at its top than at its bottom). However a cylindrical shape is preferred because of its low cost and suitability for the above purposes.

Reference is next made to FIGS. 6 to 10, which show a further modification of the invention. In FIGS. 6 to 10 double primed reference numerals indicate parts corresponding to those of FIGS. 1 to 4.

In the FIGS. 6 to 10 embodiment the hip plate 12" is formed of relatively rigid plastic having a concave inner surface 22 to improve the fit against a wearer's hip. The inner surface 22" is still of course aligned in a substantially vertical direction from its top to its bottom when worn.

Figure 6:
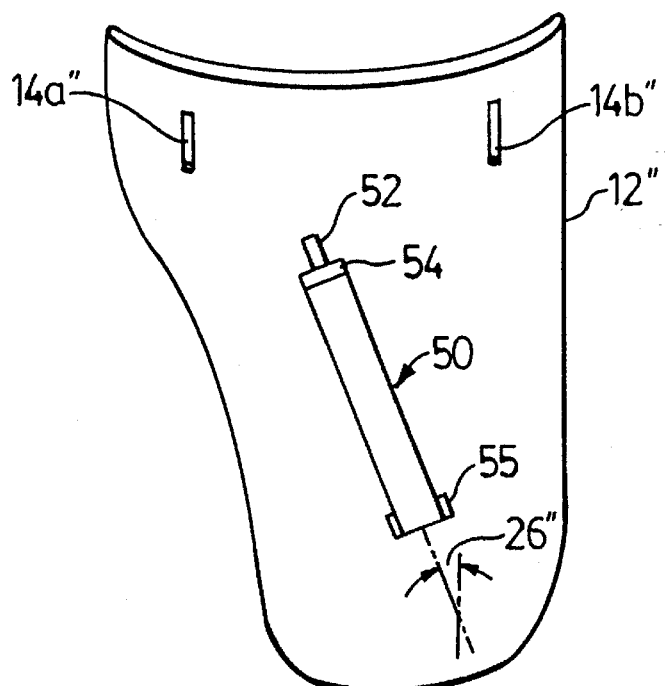
FIG. 6 is a perspective view of a modified hip plate of the fishing rod holder of FIG. 1.
Figure 7:
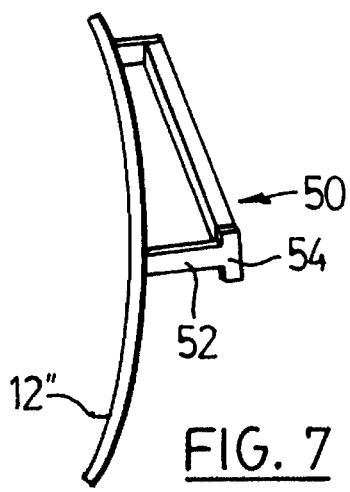
FIG. 7 is a top view of the hip plate of FIG. 6.
Figure 8:
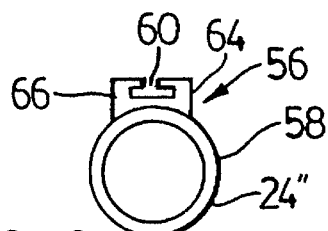
FIG. 8 is a top view of a holder for the hip plate of FIGS. 6 and 7.
Figure 9:
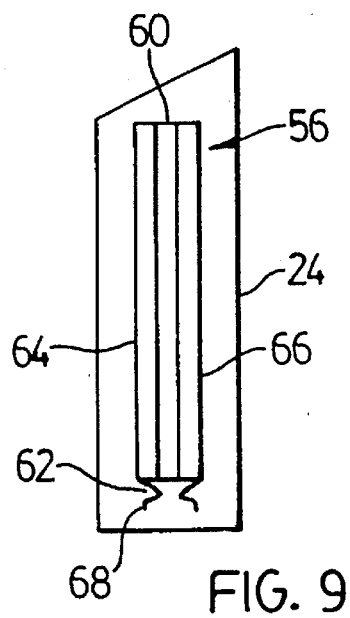
FIG. 9 is a side view of the holder of FIG. 8.
Figure 10:
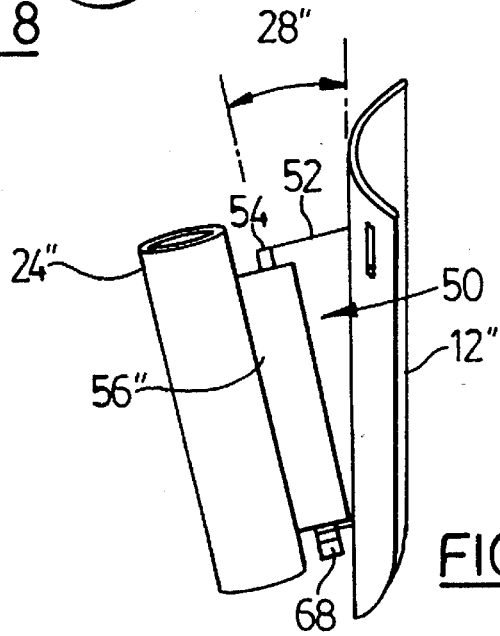
FIG. 10 is a rear view of the holder and hip plate of FIGS. 6 to 9 assembled together.

The tube 24" is no longer permanently attached to the hip plate 12", but is now removably attached. The attachment means include a rail 50 molded as part of the hip plate 12" and projecting outwardly therefrom. The rail 50 is generally T-shaped, having in section an outwardly extending base or stem 52 and an outer cross-piece 54, all integrally molded with hip plate 12". As best shown in FIGS. 6 and 10, the rail 50 has the same angles as the tube 24 of the FIGS. 1 to 4 embodiment, i.e. it slopes forwardly by angle 26" and outwardly by angle 28". Angles 26", 28" have the same ranges and preferred, values as described previously. At the bottom of rail 50 are sideways extending thin protrusions 55.

The tube 24" (FIGS. 8 to 10) has a channel 56 integrally molded on and projecting from its outer surface 58. The channel 56 has therein a T-shaped slot 60 matching the shape of rail 50 but slightly larger than rail 50, to provide clearance. A pair of generally V-shaped plastic tongues 62 extend downwardly from the bottom of opposed sides 64, 66 of channel 56. The tongues 62 terminate in downwardly extending tips 68.

In use, the tube 24" is mounted on the hip plate 12" by inserting rail 50 into the bottom of slot 60 and sliding the channel 56 downwardly on rail 50. When the bottom of channel 60 reaches the bottom of rail 50, the V-shaped resilient plastic tongues 62 snap over sideways extending protrusions 55 at the bottom of rail 50, to prevent the tube 24" from inadvertently being lifted off the rail. If it is desired to remove the tube 24", the user simply grasps the downwardly projecting ends 68 of tongues 62, pulls them outwardly, and then lifts the tube 24" off the rail 50.

The arrangement shown in FIGS. 6 to 10 has several advantages. Firstly, it facilitates molding the hip plate 12" (including the rail 50), and the tube 24" (including the channel 56) each as a unitary but separate piece, but with no assembly operation required by the manufacturer. Instead, the assembly is performed by the user, thus reducing manufacturing cost and enabling more compact packaging.

Secondly, the arrangement shown allows different types of tubes to be mounted on the rail 50 to accommodate different kinds of fishing rods.

Figure 11:
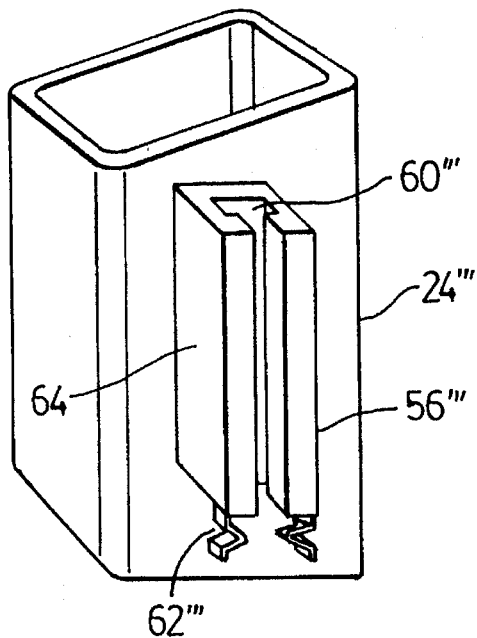
FIG. 11 is a perspective view of a modified holder for the hip plate of FIGS. 6 and 7.

For example, as shown in FIG. 11 where triple primed reference numerals indicate parts corresponding to those of the preceding drawings, the tube 24" may have a rectangular configuration, having an inside dimension for example of about 1⅝" by 2¼". This arrangement is suitable for a bait caster rod and reel, which has a different configuration from an ordinary rod and reel.

Figure 12:
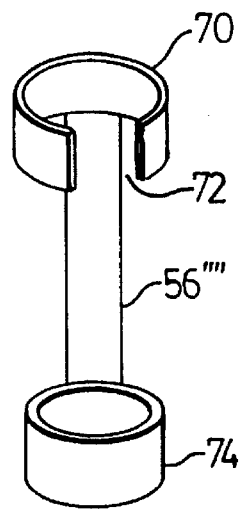
FIG. 12 is a side view of a still further modified holder for the hip plate of FIGS. 6 and 7.
Figure 13:
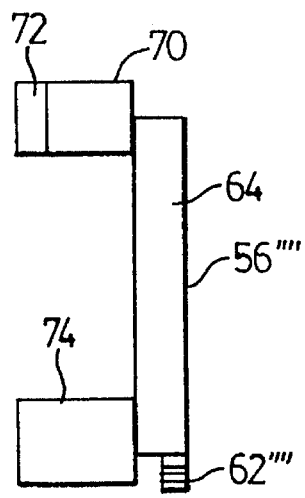
FIG. 13 is a rear view of the holder of FIG. 12.
Figure 14:
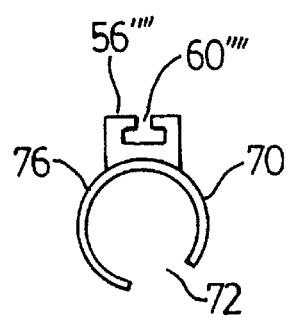
FIG. 14 is a top view of the holder of FIG. 12.

Alternatively, as shown in FIGS. 12 to 14 where quadruple primed reference numerals indicate parts corresponding to those of the preceding figures, tube or unit 24"" may be divided into an upper "ring" 70 containing a gap 72 in its circumference, and a lower closed ring 74. Gap 72 faces sideways and slightly rearwardly and is large enough to accommodate the shaft of a fly fishing rod. The two rings 70, 74 are connected together by the channel 56"" which, as before, contains T-shaped slot 60"" so that unit 24"" can be slid onto and mounted on the rail 50 of FIGS. 6, 7 and 10.

In use, the butt end of a fly rod (not shown) is inserted into ring 74 with the reel located between rings 70, 74. The shaft of the fly rod is then inserted through the gap 72 in ring 70 and rests against the forwardly facing and slightly downward leaning inner surface portion 76 of ring 70. The location of gap or opening 72 facing sideways and slightly rearwardly helps to ensure that the portion of the fly rod shaft resting against ring 70 will not inadvertently fall out of the holder when in use.

It will be appreciated that rail 50 need not be outwardly sloping. Instead it can be vertical, and the outward slope (angle 26") can be provided in channel 56. In addition, the channel can be placed on the hip plate 12" and the rail on tube or unit 24".

While a rail and channel have been shown for detachably mounting the tube 24 on the hip plate 12, other suitable attachment means may also be used if desired. For example conventional resilient snap fasteners can be used, or plastic (or metal) screws, although it would then be more difficult to remove the holder 24" to replace it with a differently shaped holder.

Although the fishing rod holder described is primarily intended to hold a rod while its user is doing other things with his/her hands, the holder can if desired also be used to hold a rod while the user is actually fishing, e.g. trolling. Because the holder is worn on the user's body, the user will immediately feel when a fish strikes, because of the forces transmitted through the holder to the user's hip. The user can then grasp the rod and attempt to reel in the fish.

While a preferred embodiment of the invention has been described, it will be appreciated that various changes may be made therein, and all such changes which are within the spirit of the invention are intended to be included in the scope of the appended claims.

I claim:

1. A fishing rod holder comprising:
   (a) a hip support plate member having an inner surface, a top and a bottom, and front and rear edges, said inner surface being shaped to rest against a wearer's hip and providing a substantial area of support for said holder against the wearer's hip, said inner surface being adapted to be worn in a substantially vertically extending direction with said front and rear edges facing substantially frontwardly and rearwardly respectively,
   (b) said hip support plate member including attachment means therein adapted to cooperate with a wearer's belt to be supported by such belt,
   (c) an elongated hollow member mounted on said hip support plate member, said hollow member having an elongated opening therethrough and including an encircling side wall, said opening having an axis,
   (d) said axis having a forward slope from a vertical line along the plate member and an outward slope from the vertical line when said holder is worn on the belt of said wearer with said inner surface of hip support plate member being substantially in a vertical plane,
   (e) said forward slope being between 20° and 45° from the vertical line and said outward slope being between 10° and 30° from the vertical line.

2. A fishing rod holder according to claim 1 wherein said hollow member is a substantially cylindrical tube.

3. A fishing rod holder according to claim 2 wherein said hip support member is formed of thin flexible plastic.

4. A fishing rod holder according to claim 1 wherein said forward slope is substantially 30° from the vertical line.

5. A fishing rod holder according to claim 4 wherein said outward slope is between 20° and 25° from the vertical line.

6. A fishing rod holder according to claim 5 wherein said outward slope is 25° from the vertical line.

7. A fishing rod holder according to claim 5 wherein said attachment means comprises slots in said hip support member.

8. A fishing rod holder according to claim 5 wherein said hollow member includes support means for a tool.

9. A fishing rod holder according to claim 1 and including attachment means for removably connecting said hollow member to said hip plate member.

10. A fishing rod holder according to claim 9 wherein said attachment means comprises a rail on one of said hollow member and said hip plate member and a channel member on the other of said hollow member and said hip plate member, said channel member being slidable on said rail.

11. A fishing rod holder according to claim 10 and including resilient locking means for removably locking said channel member and rail together.

12. A fishing rod holder comprising:
    (a) a hip support plate member having an inner surface, a top and a bottom, and front and rear edges, said inner surface being shaped to rest against a wearer's hip and providing a substantial area of support for said holder against the wearer's hip, said inner surface being adapted to be worn in a substantially vertically extending direction with said front and rear edges facing substantially frontwardly and rearwardly respectively,
    (b) said hip support plate member including attachment means therein adapted to cooperate with a wearer's belt to be supported by such belt,
    (c) upper and lower ring members mounted on said hip support plate member, said lower ring member having an opening and a closed circumference, said upper ring member having an elongated opening therethrough, said openings having a common central axis,
    (d) said axis having a forward slope from a vertical line along the plate member and an outward slope from the vertical line when said holder is worn on the belt 6f said wearer with said inner surface of hip support plate member being substantially in a vertical plane.
    (e) said forward slope being between 20° and 45° from the vertical line and said outward slope being between 10° and 30° from the vertical line.

13. A fishing rod holder according to claim 12 further including a gap in said upper ring member positioned distal to said hip support plate.

* * * * *